US008134750B2

(12) United States Patent  (10) Patent No.: US 8,134,750 B2
Chandu et al.  (45) Date of Patent: Mar. 13, 2012

(54) PRINTING WITH ALTERNATIVE HALFTONE PATTERNS IN INK JET PRINTING TO REDUCE INK PENETRATION

(75) Inventors: Kartheek Chandu, Boulder, CO (US); James F. Crossland, Boulder, CO (US); Joan L. Mitchell, Longmont, CO (US); Gary R. Williams, Arvada, CO (US)

(73) Assignee: Ricoh Production Print Solutions LLC, Boulder, CO (US)

( * ) Notice: Subject to any disclaimer, the term of this patent is extended or adjusted under 35 U.S.C. 154(b) by 503 days.

(21) Appl. No.: 12/403,492

(22) Filed: Mar. 13, 2009

(65) Prior Publication Data

US 2010/0231978 A1  Sep. 16, 2010

(51) Int. Cl.
*H04N 1/405* (2006.01)
*H04N 1/46* (2006.01)
(52) U.S. Cl. .................. 358/3.09; 358/3.3; 358/504
(58) Field of Classification Search ............. 358/3.09, 358/3.3, 504
See application file for complete search history.

(56) References Cited

U.S. PATENT DOCUMENTS

| 5,375,002 | A * | 12/1994 | Kim et al. ............. 358/521 |
| 5,602,572 | A | 2/1997 | Rylander |
| 6,867,884 | B1 | 3/2005 | Rozzi |
| 6,997,543 | B2 | 2/2006 | DeBaer |
| 7,125,091 | B2 | 10/2006 | Huang et al. |
| 7,724,397 | B2 * | 5/2010 | Lee et al. ............. 358/3.26 |
| 2007/0195341 | A1 | 8/2007 | Yao |
| 2008/0055650 | A1 | 3/2008 | Chung et al. |
| 2008/0162474 | A1 | 7/2008 | Thong et al. |
| 2008/0177764 | A1 | 7/2008 | Kise et al. |
| 2008/0192267 | A1 | 8/2008 | Watanabe |
| 2008/0195664 | A1 | 8/2008 | Maharajh et al. |

OTHER PUBLICATIONS

Shu et al., "Multiple layer screening for reducing Moire patterning and ink bleeding," Oct. 1997, International Conference on Image Processing, vol. 1, pp. 803-806.
Ostromoukhov et al., "Dithering algorithms for variable dot size printers," Sep. 1996, International Conference on Image Processing, vol. 1, pp. 553-556.

* cited by examiner

*Primary Examiner* — Charlotte M Baker
(74) *Attorney, Agent, or Firm* — Duft Bornsen & Fishman, LLP

(57) ABSTRACT

Systems and methods of printing to a tangible medium provide for reducing ink penetration via the controlled selection of halftone patterns. One method includes steps of printing to the tangible medium (e.g., via a multicolor ink supply such as CMYK) using a plurality of initial halftone patterns, measuring ink absorption of the tangible medium in response to printing to the tangible medium, and determining a subset of the plurality of initial halftone patterns based on the absorption measurement. The method also includes printing a print job to the tangible medium based on the subset of the plurality of initial halftone patterns. For example, a print controller may be reprogrammed with the subset of the plurality of initial halftone patterns to print a print job to reduce the amount of ink applied to the tangible medium.

22 Claims, 6 Drawing Sheets

PRINTING WITH ALTERNATIVE HALFTONE PATTERNS IN INK JET PRINTING TO REDUCE INK PENETRATION

BACKGROUND OF THE INVENTION

1. Field of the Invention

The invention relates to the field of production printing systems and, in particular, to reducing the amount of ink applied to a tangible medium during an ink jet printing process.

2. Statement of the Problem

A production printing system is a high-speed printer used for volume printing, such as 100 pages per minute or more. Production printing systems generally include a localized print controller that controls the overall operation of the printing system including, for example, host interfacing, interpretation or rendering, and lower level process control or interface features of print engines of the printing system. Host interaction may include appropriate adapters for coupling the printing system to one or more host systems that transmit print jobs to the printing system. The print jobs are generally encoded in the form of a page description language such as PostScript (PS), PCL, IPDS, etc.

In whatever form the print job may be encoded or formatted, the print controller within the printing system interprets the received information to generate sheetside bitmaps of the print job. The sheetside bitmaps represent the image to be printed on a side of a sheet of paper. Each sheetside bitmap generally comprises a 2-dimensional array of picture elements ("pixels") that represent a corresponding formatted sheet of the print job. Each pixel may represent an encoded color value in accordance with the requirements of the particular print job encoding and the capabilities of the printing system on which the print job is to be printed and may be represented by one or more data bits.

The print controller stores or buffers the sheetside bitmaps in accordance with storage capabilities of the particular architecture of a particular print controller. The print controller then forwards the sheetside bitmaps to one or more print engines (sometimes also referred to as an "imaging engine" or as a "marking engine"). The print engines include one or more printhead controllers that control one or more printhead arrays. Each printhead controller is associated with a printhead array so that the printhead controller is the system controlling how the printhead array discharges ink onto a medium.

Presently, when the print controller receives a print job and generates sheetside bitmaps, each pixel in the sheetside bitmaps is represented by one or more bits per pixel. Pixels of 8 bits or more can be used to represent grayscale or index color. Thus, in many production printing systems, the print controller sends full 8-bit sheetside bitmaps to each of the printhead controllers in the print engine. A full sheetside bitmap includes an entire set of pixels for an image.

After receiving an 8-bit sheetside bitmap, the printhead controller performs a halftoning or screening process on the 8-bit sheetside bitmap, which generates a 2-bit sheetside bitmap of dots varying in size and/or spacing. The printhead controller then processes a bitmap mask assigned to that controller to determine which pixels in the 2-bit sheetside bitmap to print through its associated printhead array. For example, a printhead controller may determine that its associated printhead array is to print every other line of the 2-bit sheetside bitmap, or every other pixel of the 2-bit sheetside bitmap. When printed, the dots appear to the human eye as continuous tone imagery.

In color printing, the halftone process is repeated for each subtractive color, most commonly using the Cyan Magenta Yellow Black (CMYK) color model. The semi-opaque property of ink allows halftone dots of different colors to appear as full color imagery. Problems, however, can occur when certain colors in the halftoning process are produced. For example, a pixel may be represented by multiple color components of the CMYK color model using various size ink drops and positions. Certain colors are represented with multiple drops which can saturate certain printable mediums, such as paper, and distort and/or warp the medium. Thicker paper, in many cases, can absorb more ink than thinner papers but it is generally more expensive. Moreover, in large scale printing systems, such paper is fed to the printing system in large rolls. Thicker paper generally means less printable paper per roll and thus more roll changes during printing operations. Additionally, ink density (i.e., color quality of the ink) can be lost as ink soaks into the paper rather than remaining on the surface. Further still, thicker paper is generally heavier resulting in higher shipping costs (e.g., when printed upon and shipped as part of a customer order).

To reduce ink penetration during halftone printing, color ink jet printers may limit the amount of ink deposited on a pixel using an arbitrary threshold that is believed to decrease ink penetration. That is, the ink being applied to the paper is simply limited to an amount that is believed to not penetrate the paper. For CMYK printing, this value is likely to be in the range of 150-300%, where 400% represents each CMYK component present at maximum value. Generally, displays, scanners, and cameras have larger color gamuts than printers. Limiting the ink in this manner further restricts the color gamut of the printer. In other words, the previous color ink limitation reduces the quality of a printed image even more than the already limited color gamut of the printer. A solution is therefore needed that reduces or prevents ink penetration when printing via ink jet printers while providing a larger perceived printer color gamut.

SUMMARY OF THE INVENTION

Embodiments of the present invention solve the above and other related problems by selecting halftone patterns to provide higher color densities with less water. In doing so, the color gamut of the printer may be more fully utilized without considering arbitrary ink limitation. Other advantages exist with the embodiments shown and described herein. One advantage regards the use of less ink in the printer and/or the ability to use cheaper dye inks that include more water. Alternatively or additionally, thinner paper may be used which is generally less expensive. The rolls of thinner paper are also changed less often resulting in less manual labor and printer down time. Another advantage regards the overall energy savings of the printer. For example, ink jet printers often include heaters for drying the ink after it is applied to paper. Large scale printers generally consume large amounts of energy in this process. If less ink can be used, the printer may use less energy when drying the water from the ink.

In one embodiment, a method of printing to a tangible medium includes steps of printing to the tangible medium (e.g., via a multicolor ink supply such as CMYK) using a plurality of initial halftone patterns, measuring ink absorption of the tangible medium in response to printing to the tangible medium, and determining a subset of the plurality of initial halftone patterns based on the absorption measurement. The method also includes printing a print job to the tangible medium based on the subset of the plurality of halftone patterns. For example, a print controller may be reprogrammed with the subset of the plurality of initial halftone patterns to print a print job to reduce the amount of ink applied to the tangible medium. In this regard, the subset of the plurality of initial halftone patterns may include smaller ink drop sizes (e.g., selected from Big, Medium, Small) than a portion of the initial halftone patterns.

In another embodiment, a printing system includes a print engine comprising a multi color ink supply and a plurality of print heads and a print controller operable to receive a print job from a host system and prepare the print job for printing to a tangible medium via the print engine. The print job includes a plurality of pixels and the print controller includes an interpreter module operable to generate a sheetside bitmap of the pixels and a halftone module operable to direct the print engine to print to the tangible medium using a plurality of initial halftone patterns and print the print job to the tangible medium based on a subset of the plurality of initial halftone patterns. The printing system also includes an ink penetration detection module operable to measure ink absorption of the tangible medium and determine the subset of the plurality of initial halftone patterns based on the absorption measurement.

In another embodiment, a software program of a print controller in an ink jet printing system includes instructions that direct the printing system to print to a tangible medium using a plurality of initial halftone patterns, measure ink absorption of the tangible medium in response to printing to the tangible medium, and determine a subset of the plurality of initial halftone patterns based on the absorption measurement. The software program also includes instructions that direct the printing system to print a print job to the tangible medium based on the subset of the plurality of initial halftone patterns.

The invention may include other exemplary embodiments described below.

DESCRIPTION OF THE DRAWINGS

The same reference number represents the same element or same type of element on all drawings.

DETAILED DESCRIPTION

FIGS. 1-6 and the following description depict specific exemplary embodiments of the present invention to teach those skilled in the art how to make and use the invention. For the purpose of this teaching, some conventional aspects of the invention have been simplified or omitted. Those skilled in the art will appreciate variations from these embodiments that fall within the scope of the present invention. Those skilled in the art will appreciate that the features described below can be combined in various ways to form multiple variations of the present invention. As a result, the invention is not limited to the specific embodiments described below, but only by the claims and their equivalents.

Figure 1:
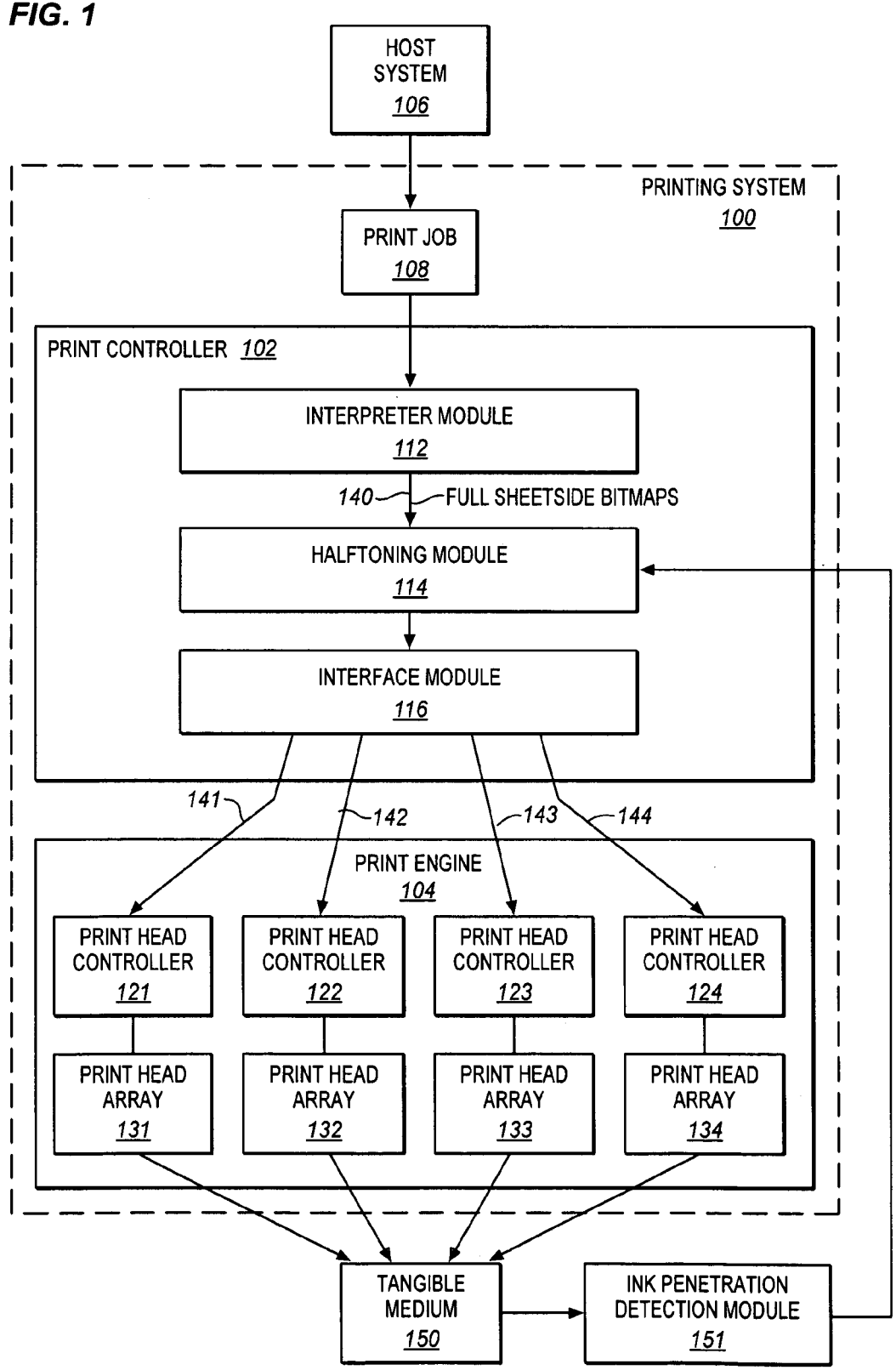
FIG. 1 is a block diagram illustrating a printing system in an exemplary embodiment of the invention.

FIG. 1 is a block diagram illustrating a printing system 100 in an exemplary embodiment of the invention. Printing system 100 comprises any system used to provide marks on a media, such as a continuous forms printer or a cut sheet page printer. In this embodiment, printing system 100 comprises a production printing system, which is a high-speed printer used for volume printing, such as 100 pages per minute or more. Printing system 100 includes a print controller 102 and one or more print engines 104. Print controller 102 comprises any system, server, or components operable to interface one or more host systems 106 with one or more print engines 104, and to control the printing of print jobs received from the host systems 106 on the print engines 104. Print controller 102 in this embodiment is a production print controller used for a production printing system. A production print controller is capable of concurrent page or sheetside rendering, meaning that an interpreter system in the print controller is operable to render multiple pages or sheetsides concurrently. Print engine 104 comprises any system operable to provide an imaging process to mark a printable medium, such as paper. Printing system 100 may include other components or systems not shown for the sake of brevity.

Print controller 102, in its generalized form, includes an interpreter system 112, a halftoning module 114, and an interface module 116. Interpreter module 112 comprises any system, device, or component operable to interpret, render, rasterize, or otherwise convert images (i.e., raw sheetsides) of a print job into sheetside bitmaps. The sheetside bitmaps generated by interpreter module 112 are each a 2-dimensional array of pixels representing an image of the print job, also referred to as full sheetside bitmaps. The 2-dimensional pixel arrays are considered "full" sheetside bitmaps because the bitmaps include the entire set of pixels for the image. Interpreter module 112 is operable to interpret or render multiple raw sheetsides concurrently so that the rate of rendering substantially matches the rate of imaging of production print engines.

Halftoning module 114 is operable to represent the sheetside bitmaps as patterns of ink drops. For example, halftoning module 114 converts the pixels to a pattern of ink drops for application to a tangible medium 150. Once computed, halftoning module 114 transfers the converted sheetside bitmaps to the print head controllers 121-124 via interface module 116 to apply the ink drop(s) to the tangible medium 150. Prior to printing a print job, however, halftoning module 114 may generate a plurality of different halftone patterns for printing to tangible medium 150 such that an ink absorption performance value of tangible medium 150 may be determined. For example, an ink penetration detection module 151 may observe tangible medium 150 after the halftone patterns have been printed to tangible medium 150. From there, ink penetration detection module 151 may determine which halftone patterns caused ink penetration within tangible medium 150 and temporarily remove those halftone patterns from printing to tangible medium 150 during the printing of a print job. Accordingly, a subset of the initial plurality of halftone patterns that were printed to tangible medium 150 are selected for printing the print job to tangible medium 150. In this regard, ink penetration detection module 151 may reprogram halftoning module 114 with the subset of halftone patterns for printing the print job to tangible medium 150. In one embodiment, the selected halftone patterns have smaller ink drop sizes and/or alternate ink drop placements with respect to the initial halftone patterns removed from the printing process.

Although described with respect to ink penetration module 151 selecting a particular subset of halftone patterns for use in printing the print job to tangible medium 150, the chosen subset of halftone patterns may be changed as desired during the printing process. For example, when a new roll of paper is fed to the printing system 100, that paper may have a different absorption value, or performance, than the previous roll of paper. Accordingly, halftoning module 114 may briefly interrupt the printing process by printing another test of halftone patterns such that ink penetration detection module 151 may select another subset of the initial halftone patterns for printing to the new roll of paper. Additionally, as ink penetration performance of a particular roll of paper may change at various points during the printing process, halftoning module 114 may briefly interrupt the printing process to print another test of the halftone patterns such that ink penetration detection module 151 may select another subset of the initial halftone patterns for printing to the presently configured roll of paper during the printing process of a print job.

Although illustrated outside printing system 100, ink penetration detection module 151 is not intended to be limited to any particular configuration. For example, ink penetration detection module 151 may be a spectrophotometer configured at the output of the printing system 100 to detect color variations in tangible medium 150 caused by ink penetration with tangible medium 150 when printing certain halftone patterns. Alternatively or additionally, ink penetration detection module 151 may be configured to physically detect thickness variations and/or warping of tangible medium 150 caused by ink penetration when printing certain halftone patterns. In any case, ink penetration detection module 151 selects those halftone patterns which are less likely to cause ink penetration in tangible medium 150 such that they may be used by halftoning module 114 for printing a print job on tangible medium 150.

Print controller 102 as shown in FIG. 1 is comprised of separate components. These separate components may represent hardware used to implement print controller 102. One or more of the separate components may also represent logical blocks implemented in a processor executing instructions.

Print engine 104, in its generalized form, includes a plurality of printhead controllers 121-124 and a plurality of printhead arrays 131-134. A printhead array comprises any component having multiple nozzles, jets, or other elements that discharge ink or some other substance used to mark a medium, such as paper. A printhead controller 121-124 comprises any system, device, or component operable to control a printhead array. In a typical printing system, there is a one-to-one relationship between the printhead controller and the printhead array, as is illustrated in FIG. 1. Thus, one printhead controller controls one printhead array. However, in some embodiments, a printhead controller may control multiple printhead arrays. Either way, a printhead controller that controls a printhead array is referred to as being "associated" with the printhead array.

Figure 2:
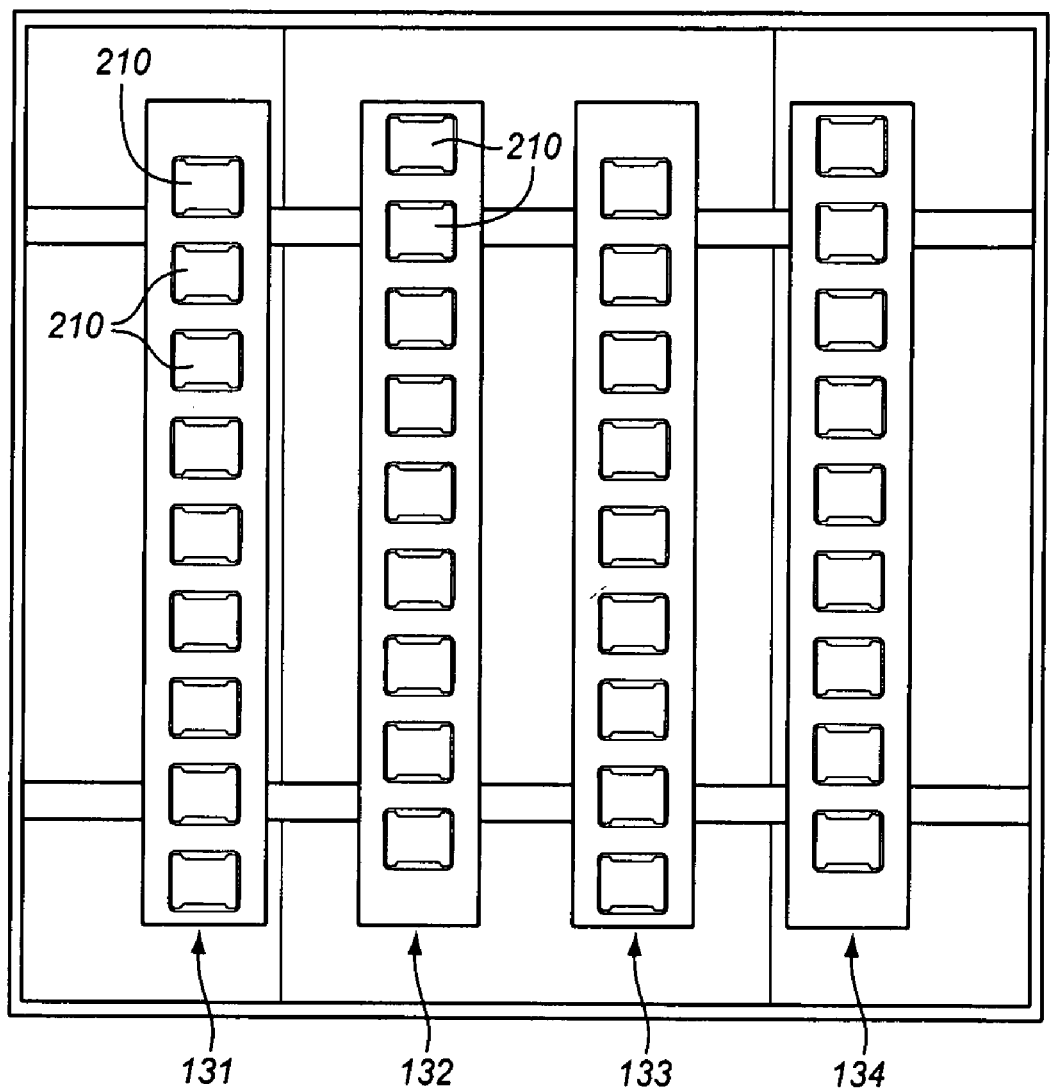
FIG. 2 illustrates printhead arrays.

FIG. 2 illustrates printhead arrays 131-134. Each printhead array 131-134 is comprised of a plurality of printheads 210. Each individual printhead 210 includes multiple tiny nozzles (e.g., 360 nozzles per printhead depending on resolution) that are operable to discharge ink or some other substance onto a printable medium when the medium is passed underneath the printheads 210. Printhead controllers 121-124 are operable to control which nozzles discharge ink on a printable medium to print an image.

In prior printing systems, the printhead controllers receive a full sheetside bitmap from the print controller. The full sheetside bitmap comprises n-bit representations of each pixel of the image. After receiving the full sheetside bitmap, each printhead controller processes a bitmap mask to determine which of the pixels of the full sheetside bitmap are to be printed by its associated printhead array. The printhead controllers then control their associated printhead array to print the pixels indicated by the bitmap mask. The following description discusses changes to halftone printing patterns that may be used to direct the print heads.

Figure 3:
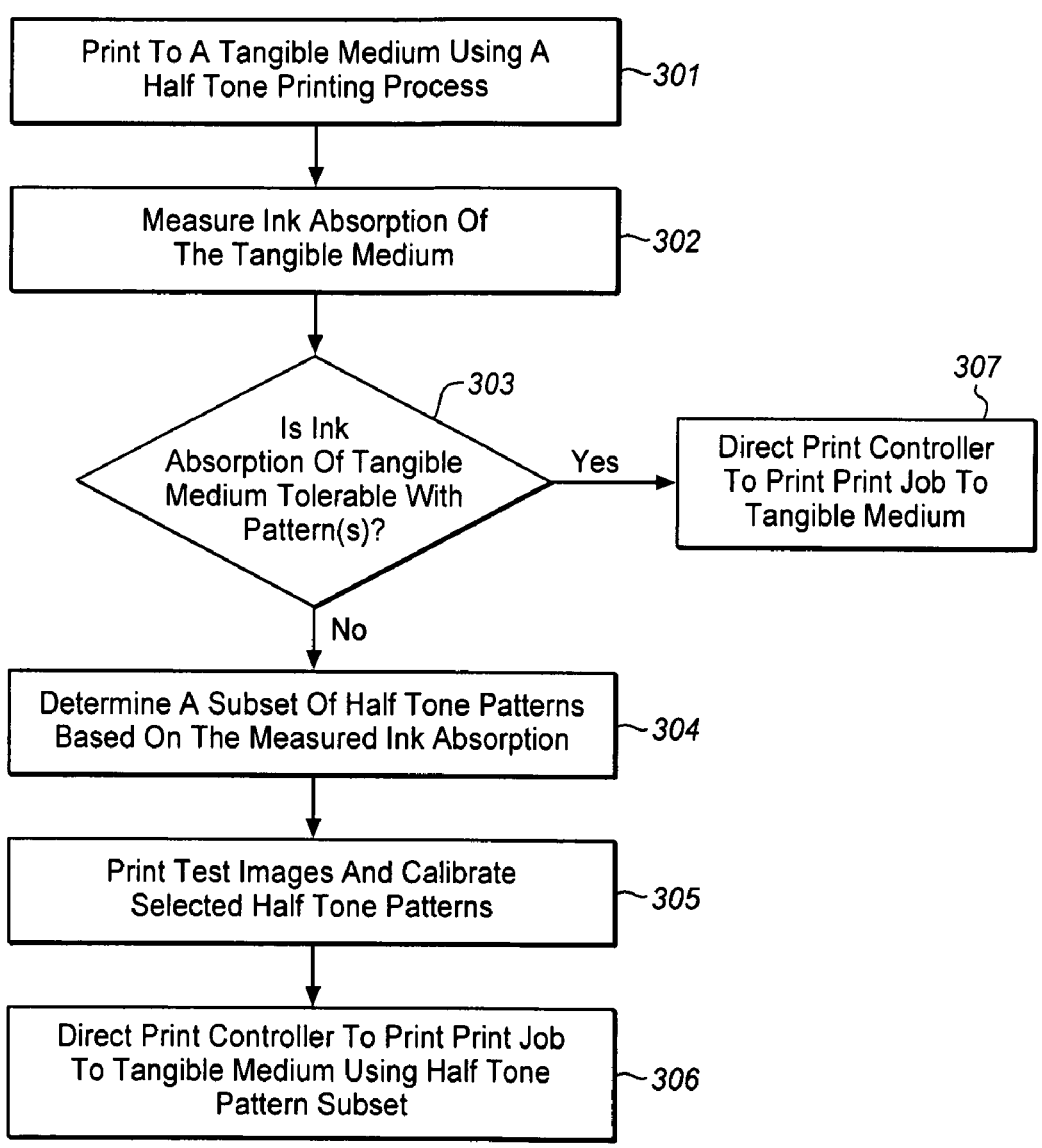
FIG. 3 is a flow chart illustrating a method of halftone printing in an exemplary embodiment of the invention.

FIG. 3 is a flow chart illustrating a method 300 of halftone printing in an exemplary embodiment of the invention. The steps of method 300 will be described with reference to print controller 102 in FIG. 1, although method 300 may be performed by other print controllers. The steps of the flow chart in FIG. 3 are not all inclusive and may include other steps not shown.

Halftoning module 114 prepares for printing a print job by printing a test of multiple halftone patterns to tangible medium 150 in step 301. Ink penetration detection module 151 measures the absorption of tangible medium 150 in step 302. For example, ink penetration detection module 151 may detect warping, thickness, and/or color density variations that may be attributed to ink penetration. In this regard, ink penetration detection module 151 may identify certain halftone patterns printed to tangible medium 150 where ink absorption is tolerable in step 303. If ink penetration is tolerable, ink penetration detection module 151 may direct halftoning module 114 to print a print job using the halftone patterns presently available to halftoning module 114 in step 307. If, however, certain halftone patterns are deemed to be outside of tolerance levels in terms of ink penetration, ink penetration detection module 151 may identify a subset of halftone patterns that are within tolerance levels to determine a subset of initial halftone patterns for use in printing based on the measured ink absorption obtained in step 304. With the halftone patterns selected, ink penetration detection module 151 may direct halftoning module 114 to print test images to calibrate the selected patterns for printing in step 305. After calibrating the selected halftone patterns, ink penetration detection module 151 may then direct halftoning module 114 to print subsequent print jobs to tangible medium 150 using the halftone pattern subset in step 306. In other words, ink penetration detection module 151 may reprogram halftoning module 114 to print using the subset of halftoning patterns. Then, halftoning module 114 may transfer the sheetside bitmaps to the print head controllers 121-124 via interface module 116 to apply ink drop(s) to tangible medium 150 via the selected halftone patterns.

In one embodiment, the effect of the relative placement of ink drops using pigment ink is considered. Table 1 shows various combinations of ink drop sizes that may be used (e.g., S, M, and B, or "Small", "Medium", and "Big"). S drops are essentially defined as using ¼ the ink of a B drop while M drops are essentially defined as using ½ the ink of a B drop. The ink drop sizes are exemplarily shown as two first size ink drops comma that are separated by two second size ink drops. The first size ink drops are repeated twice in a 2×2 square followed by the second size ink drops producing a 2×4 rectangular pattern of ink drops in an 8×8 square. The associated wetness of the proposed deposition is also illustrated in the table.

TABLE 1

|        | $S = ¼$ Small | $M = ½$ Medium | $B = 1$ Big | product wetness |
|--------|---------------|----------------|-------------|-----------------|
| SS, SS | 4             | 0              | 0           | 1.00            |

TABLE 1-continued

| | S = ¼ Small | M = ½ Medium | B = 1 Big | product wetness |
|---|---|---|---|---|
| MS, SS | 3 | 1 | 0 | 1.25 |
| SS, MS | 3 | 1 | 0 | 1.25 |
| MS, MS | 2 | 2 | 0 | 1.50 |
| MM, SS | 2 | 2 | 0 | 1.50 |
| SS, MM | 2 | 2 | 0 | 1.50 |
| SS, BS | 3 | 0 | 1 | 1.75 |
| MM, MM | 0 | 4 | 0 | 2.00 |
| BS, SS | 3 | 0 | 1 | 1.75 |
| MM, BM | 0 | 3 | 1 | 2.50 |
| BS, BS | 2 | 0 | 2 | 2.50 |
| BB, SS | 2 | 0 | 2 | 2.50 |
| BB, MM | 0 | 2 | 2 | 3.00 |
| MM, BB | 0 | 2 | 2 | 3.00 |
| BB, SB | 1 | 0 | 3 | 3.25 |
| SB, BB | 1 | 0 | 3 | 3.25 |
| BB, MB | 0 | 1 | 3 | 3.50 |
| MB, BB | 0 | 1 | 3 | 3.50 |

Figure 4:
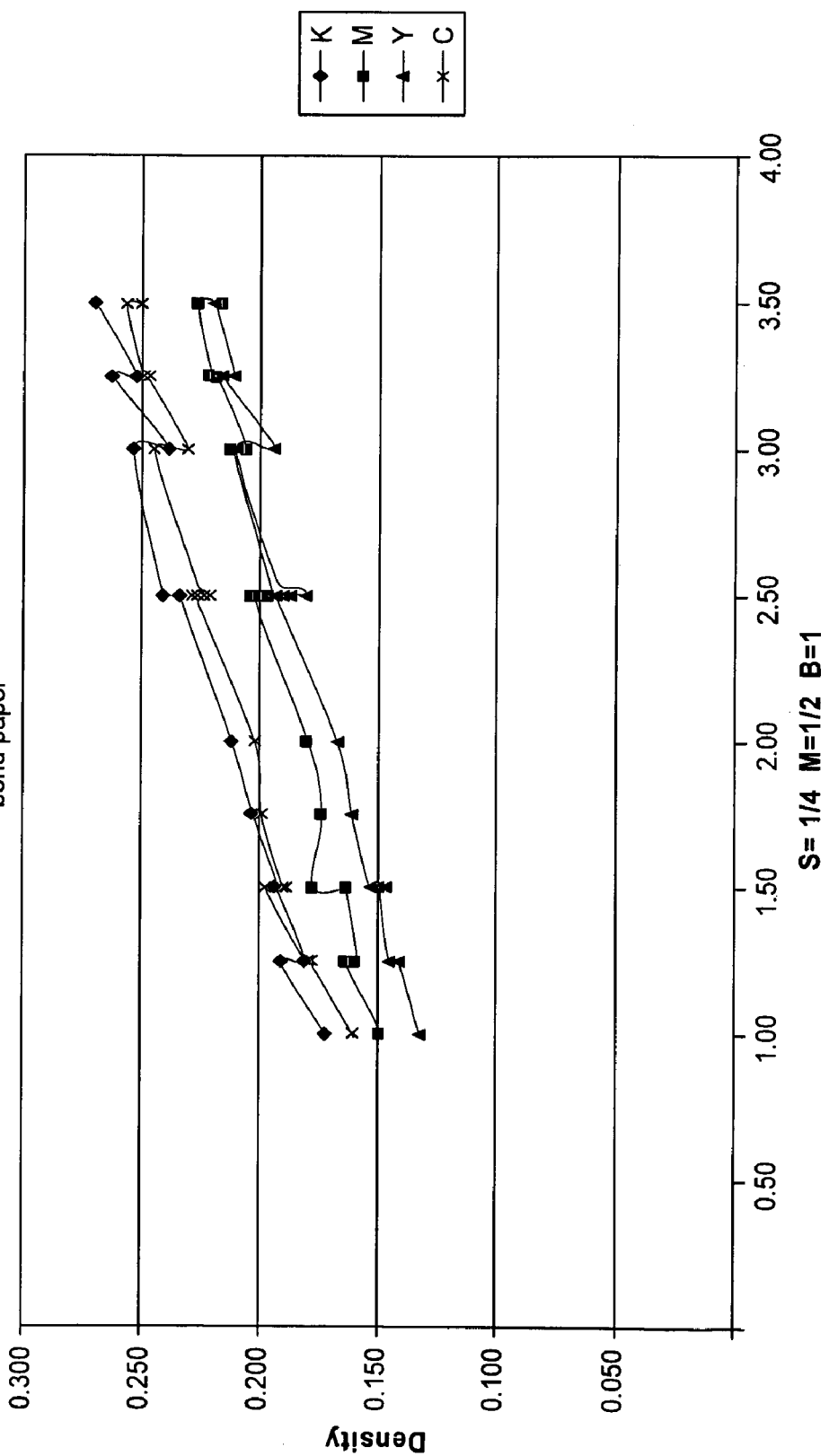
FIG. 4 is a graph of ink density versus total equivalent ink drop sizes in an exemplary embodiment of the invention.

Using a subset of these ink drop formations (i.e., the SS,BS and BS,SS combinations), a test was performed at 360 pixels/inch resolution along a paper path at 64 meters/minute on a relatively inexpensive standard 90 gsm bond paper. Graph 400 of FIG. 4 illustrates these ink drop combination densities and their resulting wetness levels. As can be seen in the graph 400, ink density does not vary greatly. Previously, an arbitrary threshold of 1.75 drops of CMYK color components would be used to simply limit the amount of ink applied to tangible medium 150. Ink penetration detection module 151 overcomes such arbitrary ink drop size selection based on a determined selection of ink drop size combinations via the halftone pattern selection process. For example, ink penetration detection module 151 may identify certain halftone patterns where the deposition of color components penetrates and ultimately saturates tangible medium 150. Ink penetration detection module 151 then removes those penetrating halftone patterns from the process, essentially decreasing ink drop sizes of one or more of the color CMYK components for use in the print job.

Table 2 shows actual measured densities of another test of an 8×8 square of ink drops for the same 24 # bond paper (i.e., 90 gsm) MOCR as a function of the number of drops for K and CMYK components. The measured densities of M size ink drops of K and CMYK in the 8×8 square were deposited as 2 to 64 drops in increments of 2.

TABLE 2

| Number of Drops | K | CMYK' |
|---|---|---|
| 2 | 0.138 | 0.165 |
| 4 | 0.166 | 0.228 |
| 6 | 0.187 | 0.275 |
| 12 | 0.265 | 0.401 |
| 14 | 0.285 | 0.454 |
| 16 | 0.301 | 0.477 |
| 22 | 0.359 | 0.609 |
| 24 | 0.384 | 0.647 |
| 26 | 0.410 | 0.665 |
| 32 | 0.470 | 0.760 |
| 34 | 0.502 | 0.793 |
| 36 | 0.517 | 0.820 |
| 42 | 0.592 | 0.889 |
| 44 | 0.614 | 0.912 |
| 46 | 0.668 | 0.920 |
| 52 | 0.715 | 0.975 |
| 54 | 0.743 | 1.000 |
| 56 | 0.747 | 1.003 |
| 62 | 0.808 | 1.022 |

TABLE 2-continued

| Number of Drops | K | CMYK' |
|---|---|---|
| 64 | 0.835 | 1.020 |

Figure 5:
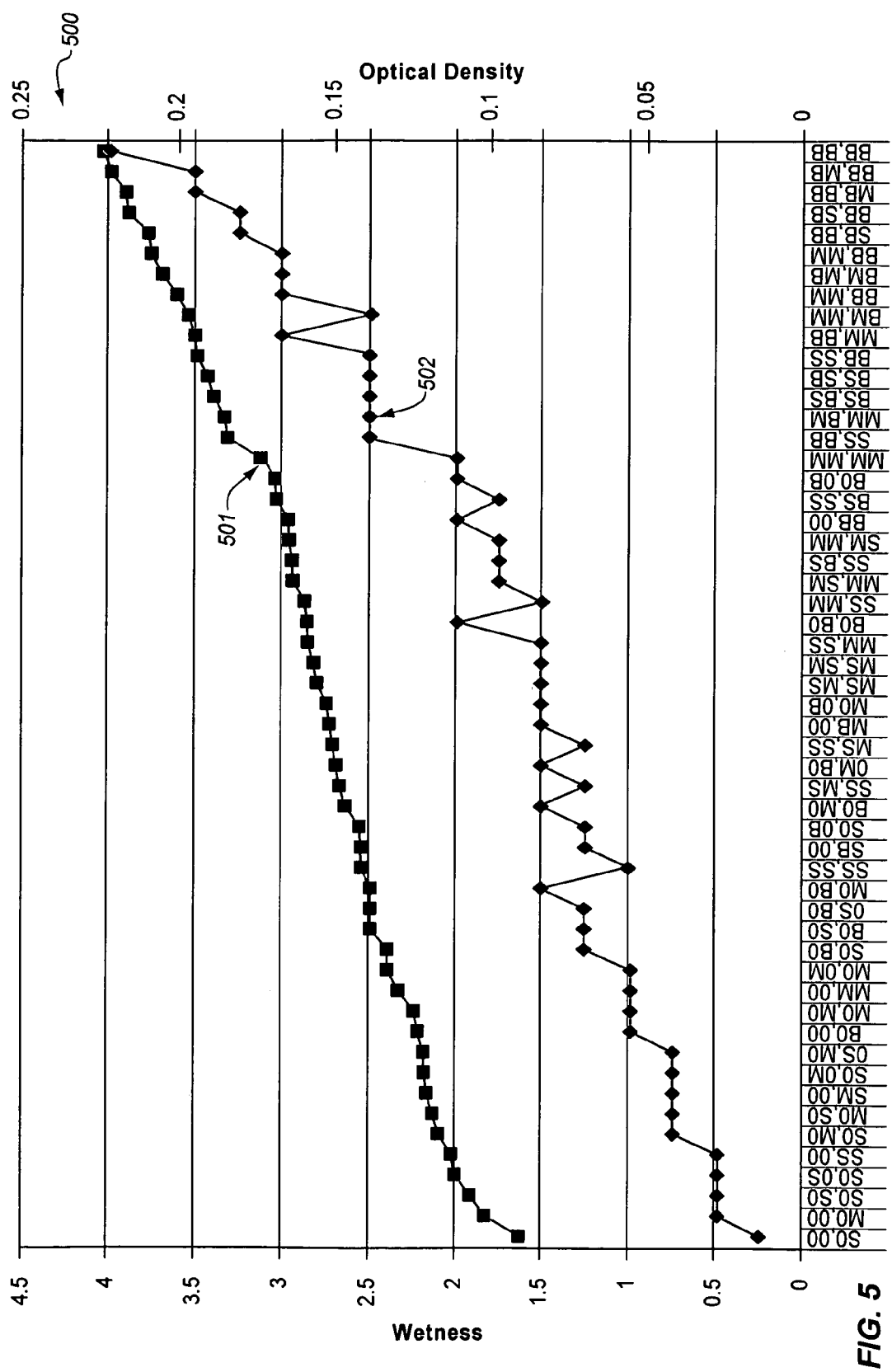
FIG. 5 is a graph of measured ink density and wetness in an exemplary embodiment of the invention.

FIG. 5 is a graph 500 of actual ink density (plot 501) and its corresponding measured wetness (plot 502) for various ink drop combinations in an exemplary embodiment of the invention.

In one exemplary algorithm that may be implemented by ink penetration detection module 151, S, M, and B drop sizes are considered as the basis for selecting certain halftone patterns. In this regard, threshold matrices are computed to select certain halftone patterns for printing print jobs. One way to achieve S, M, and B drops at the input level desired is to create a large 2-D matrix of thresholds for each drop size. Then these matrices may be conceptually replicated to cover the image. For production printers, stochastic matrices mimic the look and feel of error diffusion used in low speed ink jet printers and are practical for higher speeds. To build in the rule expressed in Table 2 these matrices can be altered on the basis of each 2×2 square. For example, noting that the maximum ink is an average of 2 ink drops per 4 squares for C, M, and Y, that K is 2.5 ink drops per 4 squares, and that K is maximized such that C, M, and Y do not all three print at the same time, multiple 4 element patterns may be used to modify threshold matrices (labeled as TL, TR, BL, and BR) as follows in Table 3:

TABLE 3

| | K | C | M | Y |
|---|---|---|---|---|
| TL | B | S | S | M |
| TR | S | M | B | M |
| BL | S | B | M | M |
| BR | B | S | S | M |

Based on this, the maximum drop for K is BSSB, for C is SMBS, for M is SBMS, for Y is MMMM. As long as only two colors exist with K, the 1.75 amount of ink is not exceeded. In the pattern above, TL is located in the top-left corner of the 2×2 square, TR is in the top-right corner of the 2×2 square, BL is located in the bottom-left corner of the 2×2 square, and BR is located in the bottom-right corner of the 2×2 square.

To compute the threshold matrices, each color component is computed as follows:

For Yellow: Set the threshold between no printing and small (S) ink drops at the average between the threshold for S and medium (M) ink drops. S'=(S+M)/2. Similarly, set the threshold for M as the average of (M+B)/2, where B is the original threshold for B ink drops. Then, set a new threshold for B'=ND (no ink drops). S' and M' sizes are then moved as a pair such that the smallest M is positioned in BL, the next smallest M' is positioned in TR, the next largest M is positioned in TL and the largest M' is positioned in BL.

For Black: The smallest B ink drop threshold is positioned in TL including its associated S and M thresholds. The next smallest B (and its associated S and M thresholds) is positioned in BR. The next smallest B (and associated M) is set to ND but its associated S thresholds are positioned in BL. The final triplet of thresholds is posited in TR and the B and M ink drop thresholds are set to ND.

For Cyan: For the two largest B thresholds, position as a unit (B, M, and S) threshold the smallest of the two B in BL and the other B in TR except for B being set to ND. For the two remaining groups, set B and M to ND, the smallest S is then positioned in TL and the other is positioned in BR For Magenta: For the two largest B thresholds, position as a unit (B, M, and S) threshold with the smallest B in TR and similarly for the other B in BL except for B being set to ND. For the two remaining groups, set B and M to ND. The smallest S is then positioned in BR and the other is positioned in TL. These combinations yield maximum density patterns as follows in Table 4:

TABLE 4

| Y | K | C | M |
|---|---|---|---|
| MM | BS | SM | SB |
| MM | SB | BS | MS |

The general idea is to map the Cyan and Magenta B and M ink drops into positions where the Black is small. When Cyan and Magenta reach their maximum at S, they are positioned over potentially B Black in drops. Other manners of manipulating ink drop sizes to select certain halftone patterns may, however, be implemented as a matter of design choice. In one embodiment, a strict ink drop assignment may provide improved performance with respect to ink penetration and color. For example, certain computations of Y in a CMYK print process have resulted Y ink drops having sizes BMSS. However, it was empirically determined that a comparable Y could be produced with Y ink drops of a size MMMM with better ink penetration resistance. Note that the table above gives the maximum size allowed. B is reached by going thorough S and M first. S is allowed in all four positions, M is allowed where M and B occur, and B is allowed where the B is listed. Thus, ink drop sizes, upon determination of ink penetration, may be changed such that only patterns of a certain singular size (e.g., all drops having an M size) are used in the printing process.

Figure 6:
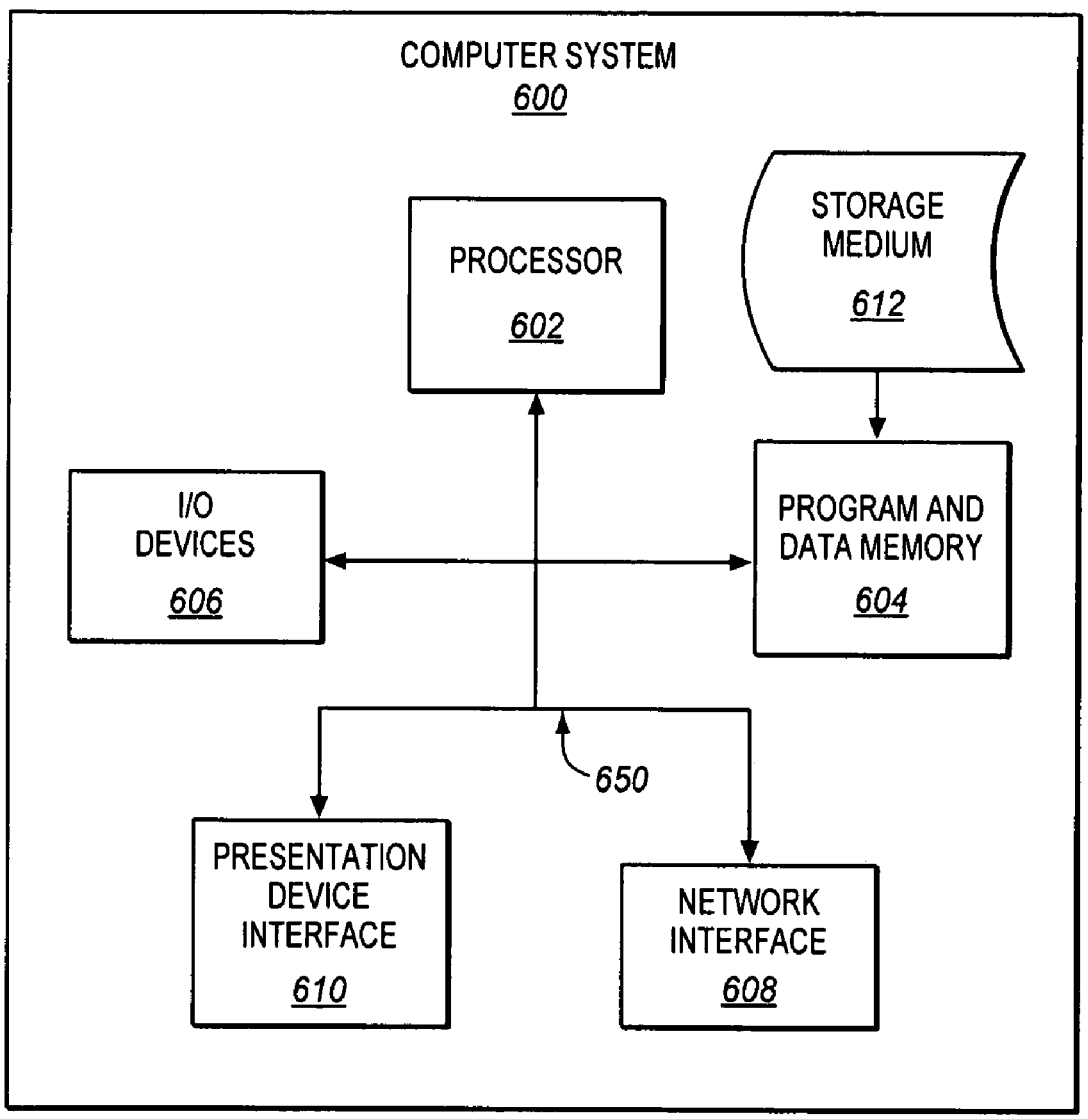
FIG. 6 illustrates a computer system operable to execute computer readable medium embodying programmed instructions to perform desired functions in an exemplary embodiment of the invention.

Moreover, embodiments of the invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 6 is a block diagram depicting a computer system 600 operable to provide features and aspects hereof by executing programmed instructions and accessing data stored on a computer readable storage medium 612.

Furthermore, embodiments of the invention can take the form of a computer program product accessible from a computer-usable or computer-readable medium 612 providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A computer system 600 suitable for storing and/or executing program code will include at least one processor 602 coupled directly or indirectly to memory elements 604 through a system bus 650. The memory elements 604 can include local memory employed during actual execution of the program code, bulk storage, and cache memories which provide temporary storage of at least some program code and/or data in order to reduce the number of times code and/or data must be retrieved from bulk storage during execution.

Input/output or I/O devices 606 (including but not limited to keyboards, displays, pointing devices, etc) can be coupled to the system either directly or through intervening I/O controllers. Network interfaces 608 may also be coupled to the system to enable the computer system 600 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 610 may be coupled to the system to interface to one or more presentation device such as printing systems and displays for presentation of presentation data generated by processor 602.

Although specific embodiments were described herein, the scope of the invention is not limited to those specific embodiments. The scope of the invention is defined by the following claims and any equivalents thereof. For example, many of the embodiments described herein relate to high end production printers capable of printing exceptionally large print jobs in a relatively short period of time. However, the inventive concepts herein may also be used in desktop printers and other printing systems where ink penetration can be problematic. Nor is the invention intended to be limited to any particular type of ink jet printer as the invention may be used in black and white ink jet printers as well as various multicolor ink jet printers. Moreover, various types of paper may be used as the tangible medium. For example, cheaper thinner papers or more expensive coated papers may be used for print jobs. In this regard, ink penetration detection module 151 may be operable to detect ink penetration in a variety of paper types so as to reduce ink penetration in print jobs.

We claim:

1. A method of printing to a tangible medium, the method comprising:
    printing to the tangible medium using a plurality of initial halftone patterns;
    measuring ink absorption of the tangible medium in response to printing to the tangible medium;
    determining a subset of the plurality of initial halftone patterns based on the absorption measurement; and
    printing a print job to the tangible medium based on the subset of the plurality of initial halftone patterns.

2. The method of claim 1, wherein the subset of the plurality of initial halftone patterns comprises smaller ink drop sizes than a portion of the initial halftone patterns.

3. The method of claim 2, wherein said ink drop sizes comprise three ink drop sizes.

4. The method of claim 1, wherein printing the print job comprises directing a print engine to apply ink from a multicolor ink supply.

5. The method of claim 4, wherein the multicolor ink supply is a CMYK ink supply.

6. The method of claim 4, wherein the ink is pigment ink.

7. The method of claim 4, wherein the ink is dye ink.

8. The method of claim 1, further comprising reprogramming a print controller with the subset of the plurality of halftone patterns.

9. The method of claim 1, further comprising:
printing a test print job comprising the subset of the plurality of initial halftone patterns; and
calibrating the subset of the plurality of initial halftone patterns based on the printed test print job.

10. A printing system, comprising:
a print engine comprising a multi color ink supply and a plurality of print heads;
a print controller operable to receive a print job from a host system and prepare the print job for printing to a tangible medium via the print engine, wherein the print job comprises a plurality of pixels and wherein the print controller comprises:
an interpreter module operable to generate a sheetside bitmap of the pixels; and
a halftone module operable to direct the print engine to print to the tangible medium using a plurality of initial halftone patterns and print the print job to the tangible medium based on a subset of the plurality of initial halftone patterns; and
an ink penetration detection module operable to measure ink absorption of the tangible medium and determine the subset of the plurality of initial halftone patterns based on the absorption measurement.

11. The printing system of claim 10, wherein the subset of the plurality of initial halftone patterns comprises smaller ink drop sizes than a portion of the initial halftone patterns.

12. The printing system of claim 11, wherein said ink drop sizes comprise three ink drop sizes.

13. The printing system of claim 10, wherein the multicolor ink supply is a CMYK ink supply.

14. The printing system of claim 10, wherein the ink is pigment ink.

15. The printing system of claim 10, wherein the ink is dye ink.

16. The printing system of claim 10, wherein the ink penetration detection module is further operable to direct halftone module to print a test print job comprising the subset of the plurality of initial halftone patterns and calibrate the subset of the plurality of initial halftone patterns based on the printed test print job.

17. A software program embodied on a tangible non-transitory computer readable medium and operable within a print controller in an ink jet printing system, the software program comprising instructions that direct the printing system to:
print to a tangible medium using a plurality of initial halftone patterns;
measure ink absorption of the tangible medium in response to printing to the tangible medium;
determine a subset of the plurality of initial halftone patterns based on the absorption measurement; and
print a print job to the tangible medium based on the subset of the plurality of initial halftone patterns.

18. The software program of claim 17, wherein the subset of the plurality of initial halftone patterns comprises smaller ink drop sizes than a portion of the initial halftone patterns.

19. The software program of claim 18, wherein said ink drop sizes comprise three ink drop sizes.

20. The software program of claim 17, wherein the printing system comprises a CMYK ink supply.

21. The software program of claim 17, wherein the software program further comprises instructions that direct the printing system to reprogram the print controller with the subset of the plurality of initial halftone patterns.

22. The software program of claim 17, wherein the software program further comprises instructions that direct the printing system to print a test print job comprising the subset of the plurality of initial halftone patterns and calibrate the subset of the plurality of initial halftone patterns based on the printed test print job.

* * * * *